United States Patent Office 3,450,543
Patented June 17, 1969

3,450,543
METHOD OF PACKAGING PERISHABLE PLANT FOODS TO PROLONG STORAGE LIFE
Adnan M. Badran, Richard E. Woodruff, and Lorenzo George Wilson, La Lima, Honduras, assignors to United Fruit Company, Boston, Mass., a corporation of New Jersey
Filed Jan. 10, 1966, Ser. No. 519,685
Int. Cl. A23l 3/00; B65b 25/04
U.S. Cl. 99—171                    14 Claims

ABSTRACT OF THE DISCLOSURE

Perishable foods whose storage life normally is less than 30 days even when refrigerated and which do not undergo a climacteric rise in respiration rate have their respiration rate reduced by enclosing them within a gas permeable flexible plastic film enclosure having a low $O_2$ content and sealing the enclosure with the result that the lowered $O_2$ content so restricts production of $CO_2$ after the equilibrium-establishing period, that the $CO_2$ escapes through the gas permeable film substantially at the same rate as it is produced.

---

Figure 1:
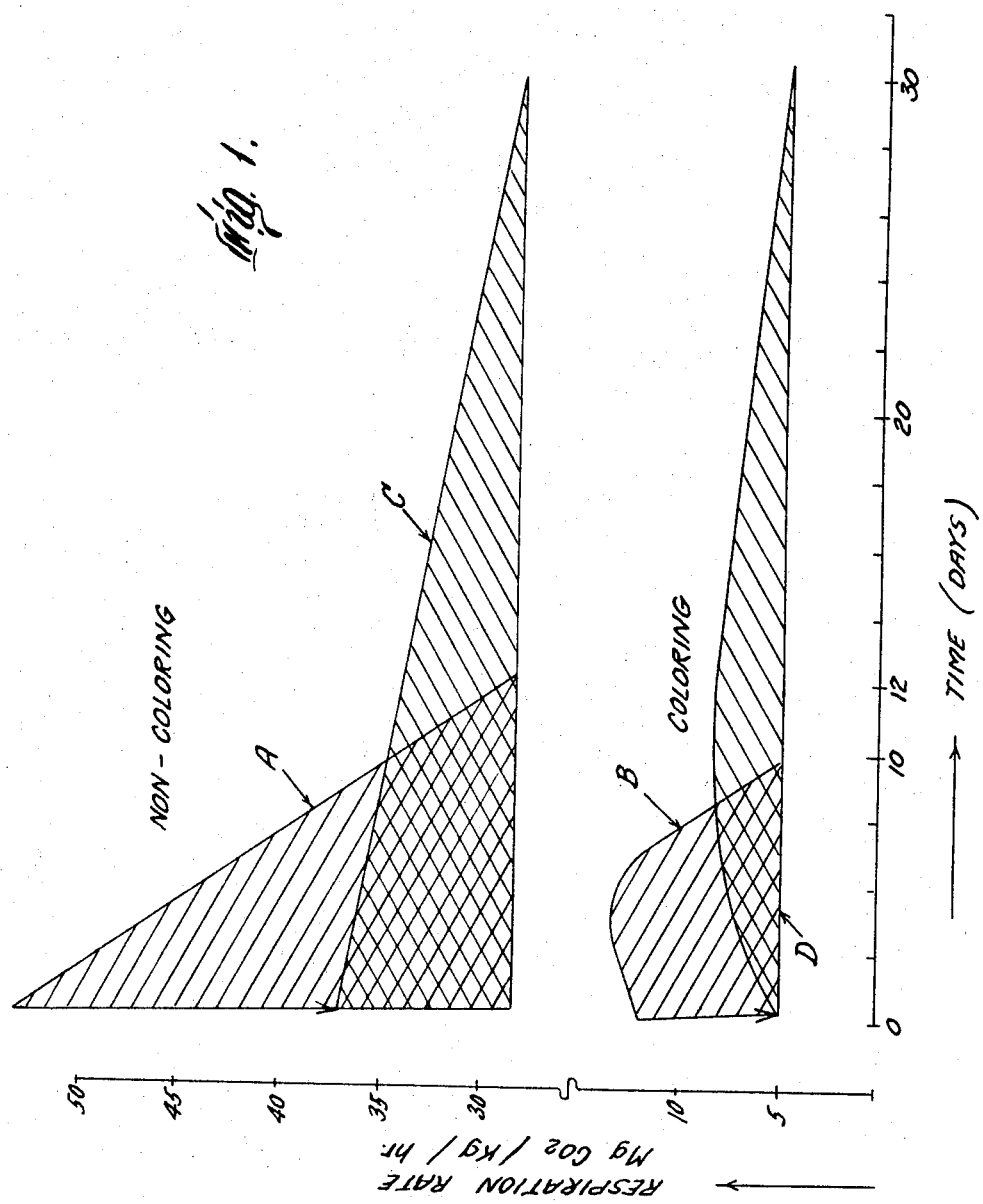

This invention relates to the packing of perishable fresh foods which during storage undergo carbohydrate breakdown leading to complete senescence and spoilage by rots within a period of 30 days as a maximum even when held refrigerated, and which after harvest do not exhibit any sharp, climacteric rise in respiration rate but rather are nonclimacteric in the sense that the respiration rate rises no more than slightly and then settles into a steady decline in any stable environment of temperature and ambient atmosphere, being exemplified by such produce as lettuce, pineapples, eggplants, peppers and other vegetables and fruits which will herein be later referred to.

Application of refrigeration to such produce tends to reduce the level of respiration (in general by one-half for every 10° C. reduction), thereby retarding deterioration, with each kind of produce having a well-known optimum above-freezing storage temperature when exposed to normal atmospheric air, but the optimum storage temperature for most such foods is often not as low as that which would be desirable solely from the standpoint of slowing the metabolism and reducing respiration because such lower temperatures will induce chilling injury observed as pits, color change, and loss of texture and flavor.

As part of this invention the respiration rate of such stored produce is lowered below that level which can be obtained solely by the use of refrigeration at the optimum temperature, through a modification of the surrounding atmosphere, in which the produce is stored, to elevate its $CO_2$ content and lower its $O_2$ content to values causing a much lower level of respiration than that caused by refrigeration at the optimum storage temperaure in and of itself. The enclosed food therefore enjoys those benefits which accrue from the use of a modified atmosphere of low $O_2$ and elevated $CO_2$ content, alone at refrigerated temperature.

While controlled atmosphere imparting these same benefits may be produced and maintained for example as shown in U.S. Patent No. 3,102,778 within impermeable rigid chambers, such a chamber is a unit captive to the supply and circulating system, as is the food contained therein and such a system requires continuous expenditure of energy to maintain controlled atmosphere within the chamber.

It is thus the main object of the invention to produce a storage pack for food as above described wherein an atmosphere of reduced $O_2$ and elevated $CO_2$ content and a relative humidity higher than 95% will be established and maintained endogenously rather than exogenously, i.e., without the use of an enclosure continuously connected to external captive power equipment of any sort.

It is a further object of the invention to provide a portable food pack utilizing a gas permeable, imperforate film enclosure which, due to the respiration characteristics of the particular enclosed produce and its high moisture content, causes the internal atmosphere to reach and maintain endogenously and automatically a modified atmosphere of reduced $O_2$ and elevated $CO_2$ content and high relative humidity during storage at the optimum temperature peculiar to the particular enclosed produce.

It is a further object of the invention to establish a desirable internal atmosphere in an imperforate, gas permeable film sealed enclosure as a result of respiration of the enclosed food of the type above described and loss of free and metabolic water in a relatively short period of time in order that the desired low level of respiration induced by the modified atmosphere and high humidity shall be reached in the shortest time possible after placing the produce within the enclosure.

According to this invention, produce of the type above described is packed in an imperforate, gas permeable enclosure whose over-all permeability to $CO_2$ and $O_2$ is so correlated to the respiration of the enclosed produce that not only is an internal low $O_2$ and acceptable elevated $CO_2$ content reached despite diffusion of $CO_2$ outwardly and infusion of $O_2$ inwardly through the gas permeable portion of the enclosure, but it is reached during the first few hours of residence of the produce within the sealed enclosure.

Obtainment of a desired $CO_2$ and $O_2$ content depends not only upon the kind, thickness, and square inch area of the permeable portion of the enclosure relative to the weight of enclosed produce, but also upon limiting the amount of $O_2$ present in the enclosure at the time of sealing so that the $O_2$ content will reach the desired level within a few hours of sealing. If too much $O_2$ is present initially, the establishment of a proper low level of $O_2$ may never be reached or may be reached only after a week or so, by which time too fast respiration rate will have caused substantial deterioration.

Heretofore, it has been thought that a reliable establishment of low oxygen content atmosphere automatically in sealed gas-permeable enclosures was not possible in the case of produce which did not exhibit a sharp rise in metabolism during a climacteric stage of ripening. It has now been found, in accordance with this invention, that if the square inch area of the permeable part of the enclosure is reduced to as small a value as possible per unit weight of foods of the type above described without reducing it to so small an area as would fail to provide sufficient $CO_2$ and $O_2$ diffusion to maintain proper levels of lowered $O_2$ and elevated $CO_2$ content compared with that of normal air after they have been established, such enclosures do have distinct value in prolonging the storage life of such foods, in manually portable packs.

This means that in the case of films of available gas permeabilities and of sufficient thickness to be practical from a strength standpoint and where the entire enclosure is formed of the film, the film is collapsed around the produce at the time of packing and sealing the produce within the enclosure, in order to reduce the initial air volume as much as possible and to a point preferably where there are 235 cc. or less of $O_2$ present per kilogram of enclosed produce.

In this way, the $O_2$ demand of the produce on the initial 21% $O_2$ concentration will rapidly consume the enclosed $O_2$ faster than it can be replaced through the film.

As the $O_2$ concentration decreases, the respiration rate will correspondingly decrease so that by the time the $O_2$ content reaches a value, for example, under 12%, the film will infuse at the partial pressure an amount of $O_2$ sufficient to maintain that rate of respiration. And surprisingly it has been found that when the $O_2$ is maintained at a desirable low concentration, the $CO_2$ can be kept from rising above an acceptable level.

Moisture from the food either originally present as free water or given off as a reaction product of metabolism quickly raises the relative humidity in the enclosure to close to 100% at which level it is maintained because of the substantially moisture impermeable nature of the enclosure—being only about 1.2 cc. per 24 hours per 100 square inches per mil at 100° F.

High relative humidity within the enclosure prevents desiccation and therefore contributes to reduction in desiccated tissue rots, and prevents weight loss.

In addition to transmitting $CO_2$, polyethylene film as used in accordance with this invention transmits other nonaqueous volatiles, associated with metabolism emanating from the food, as the result of partial pressure differential with the outside atmosphere; and thereby such volatiles are automatically removed from the environment before their concentration becomes high enough to adversely affect the flavor and quality of the produce. Such volatiles are most noticeable in the case of cauliflower and broccoli.

FIG. 1 is a graph illustrating curves roughly typical, but not intended to be exact, of nonclimateric produce respiration rates during storage at 32° F. Produce which does not exhibit a color change after harvest and exemplified by such produce as broccoli, cauliflower, cucumbers, etc., may have respiration rates up to 50 milligrams $CO_2$ per kilogram per hour or more at this temperature. As storage proceeds, metabolism of the produce tends, with consumption of oxygen, to break down the contained carbohydrate at a fairly steady rate as illustrated by the curve A until a complete senescence and spoilage of the produce occurs as shown in the graph at the end of about 12 days. Curve B is generally illustrative of a group of nonclimacteric produce which does undergo color change after harvest and is exemplified by such produce as strawberries. These coloring foods tend to have a slight increase in their respiration rates during the coloring period before the onset of senescence but still are classified for the purposes of this application as being nonclimacteric. Curve B indicates spoilage at the end of 10 days in a normal air environment. Curve C is indicative of what happens when the respiration rate is rapidly reduced by sealing the produce in film enclosures in accordance with this invention. As indicated by the arrow between the beginning of curve A and curve C, the respiration rate is rapidly lowered within a period of 6 hours from, for example, the initial 50+ milligrams $CO_2$ per kilogram per hour to 37 milligrams or less. This results in the senescence curve C assuming a lesser slope and extending over a period as shown by the graph up to 30 days. The amount of oxygen consumption over the 30-day period is substantially identical with the amount of oxygen consumed by unsealed produce over the 12-day period of senescence, as indicated by the roughly equivalent shaded areas under curves A and C. In each case complete senescence occurs only after all the carbohydrate has been broken down.

Curve D illustrates generally what happens in the case of a coloring produce when sealed in film enclosures in accordance with this invention. After the initial 6 hours the respiration has been again reduced from an initial 12 milligrams $CO_2$ per kilogram per hour to about 5 milligrams and although a rise in respiration still occurs before senescence sets in, the curve is extended similarly over a period of 30 days. Here again the total oxygen consumption to complete senescence is substantially equal whether respiration is suppressed by the controlled atmosphere or not.

Figure 2:
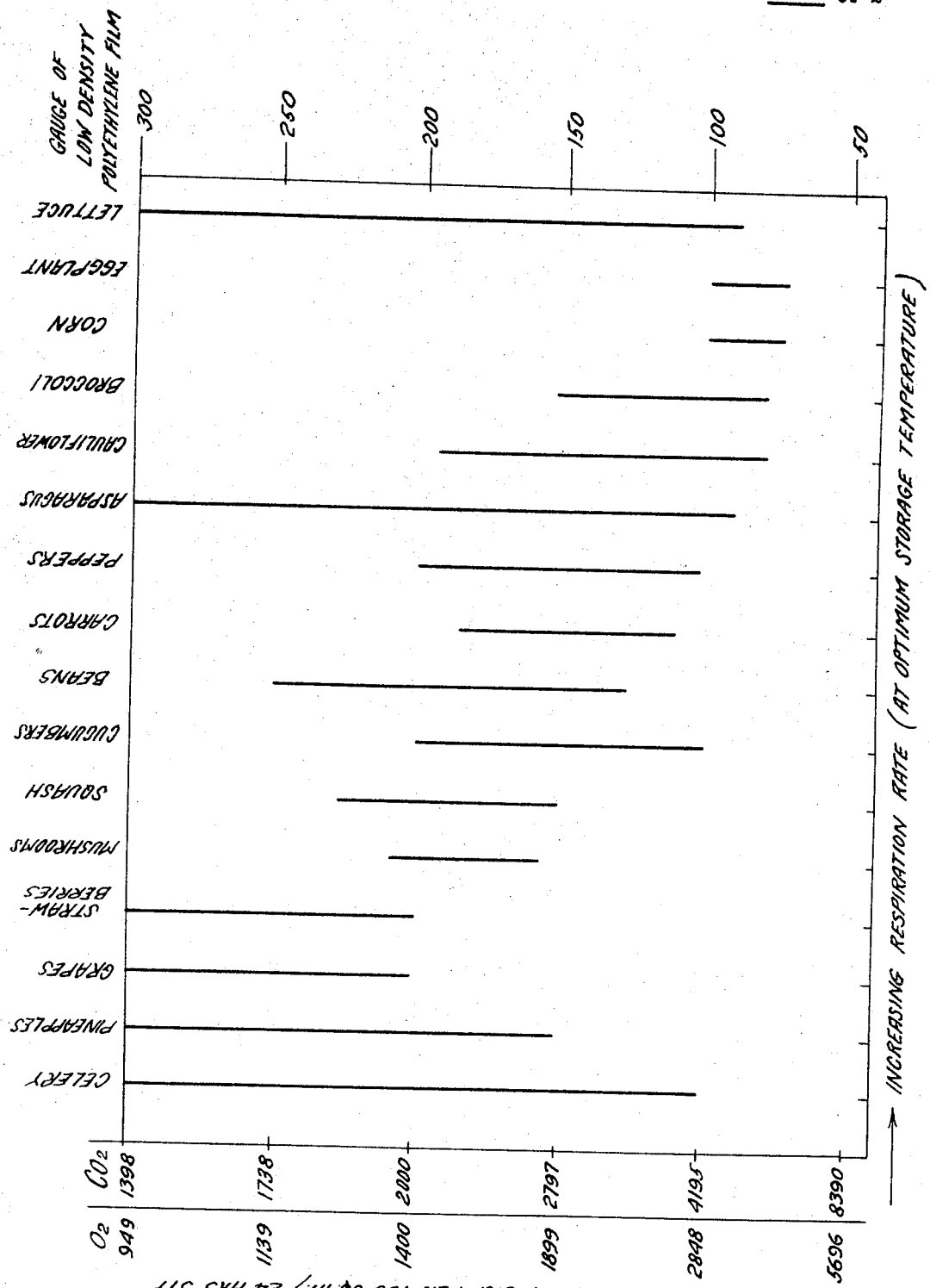

FIG. 2 is a bar chart generally illustrating how in the case of various nonclimacteric produce the thickness of desirably useful films of given permeability decreases for produce having increasing respiration rates. Each bar represents the range of useful permeability for a given product. In addition, there is shown for each permeability the gauge of a low density polyethylene corresponding to that permeability, namely one having a permeability of $O_2$ of about 2848 cc., and to $CO_2$ of about 4195 cc., both per mil per 100 square inches per 24 hours at STP (0° C., 760 mm. of Hg), as measured substantially in accordance with the procedures described in Journal Applied Polymer Science, volume 7, pages 2035–2051, 1963. Gauge is the mil thickness multiplied by 100. In FIG. 2 the produce is listed from left to right generally in the order of increasing respiration rates in normal air. As can be seen, film thicknesses which are perfectly suitable for high respiration produce such as corn and eggplant are entirely unsuitable for produce such as grapes and strawberries. Conversely thicknesses above 250 gauge which are perfectly suitable for celery, pineapple, grapes and strawberries are wholly unsuitable for the other produce with the exception of lettuce.

Thus the bar chart illustrates the absolute necessity of correlating the overall permeability of the film to the respiration rate of the enclosed weight of produce at the storage temperature. Otherwise, in the case of high-respiring produce, accumulation of $CO_2$ in too thick enclosures will cause suffocation or pickling. Conversely, if the film is too thin, the oxygen content within the sealed enclosure will remain too high and fail to suppress respiration and delay senescence.

All plant food is susceptible to injury by exposure to $CO_2$ in too high percentages, particularly at low $O_2$ level even at optimum storage temperatures. The exact subinjurious maximum varies depending upon the particular food and therefore preferably should be taken into account in fixing the various variables of thickness, permeability and film area to enclosed food weight ratio so as to insure that the $CO_2$ level will not rise during the period of storage above the permissible maximum for the particular food. Thus, for example, strawberries tolerate $CO_2$ contents as high as 12% whereas such foods as eggplants will not tolerate much in excess of 6.5%.

The following are examples of practice in accordance with this invention as to the products referred to in FIG. 2.

EXAMPLE I.—LETTUCE

Heads of lettuce are perishable foods whose maximum storage period at 32° F. in normal air is accepted as being only from about 2–3 weeks. When lettuce is held temporarily out of cold storage, crushed ice is normally used to keep this product fresh by preventing drying or wilting. Ice sometimes causes severe freezing injury to lettuce.

Lettuce is nonclimacteric plant material and its oxygen demand is of the order of 37 milligrams $O_2$ per kilogram lettuce per hour at 32° F.; or 52 milligrams $O_2$ per kilogram lettuce per hour at 40° F. (Agricultural Handbook No. 66, U.S. Department of Agriculture, September 1954.)

One or two heads of freshly harvested lettuce weighing approximately 0.430 kilogram each were placed in an open-mouthed bag of polyethylene film of varying thicknesses from 75 to 300 gauge having a permeability as previously described. After insertion of the produce and prior to sealing each bag, 343 cc. of air were exhausted, leaving within the sealed bag about 292 cc. of air which contained $O_2$ in the amount of about 136 cc. $O_2$ per kilogram lettuce. The bag had an internal area of about 187 square inches. The internal film surface area was 1 square inch per 0.0023 kilogram of enclosed lettuce. After 3 hours at 32°–34° F. the sealed 250 gauge enclosure was sampled for its $O_2$ and $CO_2$ content and found to be 10.5% $O_2$ and 1.3% $CO_2$ as compared to its original content of 21% $O_2$ and 0.03% $CO_2$.

The sealed packages of freshly harvested lettuce were stored at 32°–34° F. for a period of 6 weeks. Periodic analyses of $O_2$ and $CO_2$ of the internal atmosphere were taken at weekly intervals. Results are shown in the following table:

| Film Gauge | Days in Storage | | | | | | | | | | | |
|---|---|---|---|---|---|---|---|---|---|---|---|---|
| | 7 | | 14 | | 21 | | 28 | | 35(42*) | | Mean | |
| | $CO_2$ | $O_2$ | $CO_2$ | $O_2$ | $CO_2$ | $O_2$ | $CO_2$ | $O_2$ | $CO_2$ | $O_2$ | $CO_2$ | $O_2$ |
| 80 | 1.6 | 13.0 | 1.6 | 12.0 | 0.6 | 13.0 | 1.0 | 12.0 | 2.0 | 5.6 | 1.4 | 11.1 |
| 100 | 1.6 | 12.6 | 2.0 | 11.3 | 1.2 | 12.0 | 1.6 | 10.0 | 3.2 | 4.2 | 1.9 | 10.0 |
| 125 | 2.2 | 11.0 | 1.8 | 11.4 | 1.0 | 10.8 | 2.8 | 6.4 | 1.8* | 9.8* | 1.9 | 9.9 |
| 150 | 3.6 | 10.6 | 2.6 | 9.4 | 3.0 | 9.8 | 2.6 | 9.8 | 3.6* | 6.0* | 3.1 | 9.1 |
| 200 | 3.2 | 10.0 | 3.2 | 8.0 | 2.8 | 9.2 | 2.0 | 7.0 | 4.0* | 8.8* | 3.0 | 8.6 |
| 250 | 4.6 | 9.4 | 4.2 | 4.2 | 3.6 | 7.0 | 4.2 | 3.6 | 7.8 | 1.0 | 4.9 | 5.0 |
| 300 | 4.8 | 8.4 | 5.8 | 4.6 | 5.5 | 6.9 | 5.4 | 1.2 | 4.6* | 7.0* | 5.2 | 5.6 |

At the expiration of 6 weeks, the heads of lettuce in 300 gauge film were in the best condition. This lettuce looked fresh, turgid and had only traces of slimy rots on the outer leaves in contact with the moist internal wall of the bag; and when these were trimmed away, heads of lettuce were left in excellent condition. Heads of lettuce in other gauge films had varying degrees of rots but were fresh, turgid and in excellent condition when the rotted leaves were removed. These were compared with control heads of lettuce stored at the same temperature in normal air, the latter had wilted, shrunk, and lost their bright green color within 2 weeks; the leaves had lost their turgidity, edges turned yellow and became dull in appearance. Control heads were considered unmarketable.

Leafy lettuce packaged in a similar manner in 130–300 gauge polyethylene film bags evacuated of excess air at the time of packing remained green and fresh without rot for a period of two weeks in comparison with similar produce which became unmarketable after five days of storage under the same conditions, not including the polyethylene enclosure. Internal atmosphere composition ranged between 3.6–9.2% around a mean of 6.8% $O_2$, and 2.2–7.8% around a mean of 4.6% $CO_2$.

EXAMPLE II.—ASPARAGUS

Fresh asparagus stalks are perishable food which deteriorate rapidly at temperatures above 32° F. They lose quality quickly and a storage period of 3 weeks in normal air at 32° F. is normally accepted as maximum. They are nonclimacteric plant material and their oxygen demand is in the order of 21.3 cc. of $O_2$ per kilogram asparagus per hour at 32° F.

One bunch of asparagus weighing approximately 1.134 kilograms was placed in open-mouthed bags of polyethylene film of varying thicknesses from 80 to 300 gauge having the same permeability as the film used in Example I. Prior to sealing each bag about 600 cc. of air were exhausted, leaving within the sealed bags about 530 cc. of air which contained $O_2$ in the amount of about 93.4 cc. $O_2$ per kilogram of enclosed asparagus. The bags had an internal surface area of 264 square inches being one square inch of permeable film per 0.0043 kilogram asparagus.

The sealed packages were stored at 32°–34° F. for a period of four weeks, taking weekly $O_2$ and $CO_2$ readings of the internal atmosphere. The results are shown in the following table:

| Film Gauge | Days in Storage at 32–34° F. | | | | | | | | | |
|---|---|---|---|---|---|---|---|---|---|---|
| | 7 | | 14 | | 21 | | 28 | | Mean | |
| | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ |
| 80 | 6.4 | 5.6 | 6.0 | 5.4 | 3.8 | 13.0 | 3.6 | 13.4 | 4.9 | 9.3 |
| 125 | 6.8 | 1.2 | 7.8 | 1.4 | 4.0 | ---- | 6.7 | 1.7 | 6.3 | 1.4 |
| 150 | 10.2 | 0.6 | 11.4 | 1.2 | 9.0 | 1.2 | 7.1 | 1.9 | 9.4 | 1.2 |
| 200 | 13.4 | 0.6 | 12.2 | 1.8 | ---- | ---- | 11.0 | 1.2 | 12.2 | 1.2 |
| 250 | 17.2 | 1.4 | 13.0 | 2.2 | 12.8 | 1.0 | 11.8 | 0.9 | 13.7 | 1.4 |
| 300 | 18.6 | 2.2 | 16.0 | 1.4 | 14.0 | 1.4 | 10.6 | 1.8 | 14.8 | 1.7 |

At the expiration of four weeks the spears of asparagus in 80–150 gauge polyethylene films were fresh in appearance, turgid and rot free. Asparagus spears packed in other film thicknesses had varying degrees of leakage due to bacterial soft rot infection with the exception of spears in 300 gauge film but those bunches of spears free of rot were in an excellent condition. These were compared with control spears of asparagus stored at the same temperature in normal air having severely wilted, shrunk and lost their green color within one week; the spears had lost their turgidity and become darkened and dull in appearance; the spears were soft and unmarketable.

EXAMPLE III.—MUSHROOMS

Mushrooms are a highly perishable food, the storage period of which at 32° F., 50° F. and 70° F. in normal air is accepted as being only 3–4 days, 2 days and 1 day, respectively. They are non-climacteric plant material and their oxygen demand is in the order of 20.4, 73.0 and 192.4 milligrams of $O_2$ per kilogram of mushrooms per hour at 32° F., 50° F. and 70° F., respectively.

About 25 medium sized mushrooms weighing approximately 0.196 kilogram were placed in open-mouthed bags of polyethylene film. This film varied in thickness from 80 to 300 gauge and had the same permeability as the film used in Example I. Prior to sealing each bag, about 214 cc. of air were exhausted, leaving within the sealed bags 131 cc. of air which contained oxygen in the amount of about 136.6 cc. oxygen per kilogram of enclosed mushrooms. The bags had an internal area of 154 square inches being 1 square inch per 0.0013 kilogram mushrooms.

The sealed mushrooms were stored at 32–34° F., 50° F. and 70° F. for varying periods, taking periodic $CO_2$ and $O_2$ readings of the internal atmospheres. The results are shown in the following tables:

surface to the confined content was 1 square inch per 0.0063 kilogram of enclosed peppers.

| | Days at 32–34° F. | | | | | | | | Days at 50° F. | | | | | |
|---|---|---|---|---|---|---|---|---|---|---|---|---|---|---|
| | 3 | | 7 | | 14 | | Mean | | 3 | | 7 | | Mean | |
| Film Gauge | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ |
| 80 | 4.8 | 2.4 | 5.8 | 1.6 | 4.4 | 1.2 | 5.0 | 1.7 | 6.0 | 1.2 | 5.8 | 1.6 | 5.9 | 1.4 |
| 125 | 6.4 | 1.0 | 6.0 | 2.2 | 4.8 | 1.2 | 5.7 | 1.5 | 6.8 | 1.0 | 6.4 | 0.8 | 6.1 | 0.9 |
| 150 | 6.8 | 0.6 | 5.6 | 2.4 | 6.0 | 1.0 | 6.1 | 1.3 | 8.6 | 0.8 | 7.6 | 1.4 | 8.1 | 1.2 |
| 200 | 10.8 | 0.6 | 8.8 | 1.0 | 7.6 | 3.0 | 9.1 | 1.5 | 11.0 | 0.8 | 9.0 | 1.2 | 10.0 | 1.0 |
| 250 | 9.2 | 1.4 | 8.4 | 1.8 | 8.0 | 0.8 | 8.5 | 1.3 | 9.4 | 2.4 | 8.6 | 0.6 | 9.0 | 1.5 |
| 300 | 13.6 | 0.8 | 10.8 | 2.0 | 9.6 | 1.8 | 10.3 | 1.5 | 14.8 | 1.2 | 12.8 | 1.2 | 13.8 | 1.2 |

| Mushrooms held at 70° F. for 3 days—Film gauge | | | | | | |
|---|---|---|---|---|---|---|
| | 80 | 125 | 150 | 200 | 250 | 300 |
| Percent: | | | | | | |
| $CO_2$ | 5.8 | 6.4 | 7.6 | 9.0 | 8.6 | 12.8 |
| $CO_2$ | 1.6 | 0.8 | 1.4 | 1.2 | 0.6 | 1.2 |

At the expiration of two weeks at 32–34° F. the mushrooms packed in 1.5 and 2.0 mil polyethylene films were in good condition. These mushrooms had slight browning but the veils were closed and the mushrooms were turgid. Mushrooms in other film thicknesses at 32–34° F. had more severe browning, open veils and initial physiological breakdown. These were compared with control mushrooms which had more surface browning, open veils and severe desiccation; deterioration of the veils and stalk had started and the mushrooms were unmarketable.

At the expiration of one week at 50° F. all mushrooms packed in polyethylene films were still in good condition. The mushrooms had only a trace of browning and a trace of veil opening. These were contrasted to control mushrooms with complete veil opening and slight browning.

At the expiration of three days at 70° F. all mushrooms packed in polyethylene films had only slight browning and closed veils. These were compared to control mushrooms which showed browning, deterioration and complete veil opening; the control mushrooms were in an unmarketable condition.

EXAMPLE IV.—PEPPERS

Green peppers are perishable foods whose storage period in normal air is accepted as being only about 8 to 10 days at a temperature range of 45–55° F. Peppers show serious deterioration marked by pitting, decay and shrivelling and sometimes ripening (red color) when stored further than 10 days.

Peppers are nonclimacteric plant material and their oxygen demand is in the order of 9.2 milligrams $O_2$ per kilogram peppers per hour at 32° F.; or 15.6 milligrams $O_2$ per kilogram peppers per hour at 40 F.; or 28.1 milligrams $O_2$ per kilogram peppers per hour at 60° F.

Green peppers weighing approximately 0.79 kilogram were placed in an open-mouthed bag of polyethylene film of varying thicknesses from 100 to 300 gauge having the same permeability as the film used in Example I. Prior to sealing each bag, 403 cc. of air were exhausted leaving within the sealed bags 255 cc. of air which contained $O_2$ in the amount of 64.5 cc. $O_2$ per kilogram of enclosed peppers. The bags had an internal surface area of 124 square inches. The ratio of collapsed internal film surface to the confined content was 1 square inch per 0.0063 kilogram of enclosed peppers.

After 3 hours at 45° F., the sealed 150 gauge was sampled for its $O_2$ and $CO_2$ content and found to be 8.0% $O_2$ and 2.0% $CO_2$ as compared to its original content of 21% $O_2$ and 0.03% $CO_2$.

The sealed packages of freshly harvested peppers were stored at 45° F. for a period of four weeks. Periodic analyses of $O_2$ and $CO_2$ were taken of the internal atmosphere. Results of atmospheric composition surrounding the confined peppers under the most suitable film gauges are shown in the following table:

| | Days in Storage at 45° F. | | | | | | | | | |
|---|---|---|---|---|---|---|---|---|---|---|
| | 7 | | 14 | | 21 | | 28 | | Mean | |
| Film Gauge | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ |
| 100 | 2.8 | 6.8 | 3.6 | 5.8 | 3.2 | 6.8 | 3.2 | 6.5 | 3.2 | 6.5 |
| 125 | 3.0 | 3.2 | 3.0 | 7.0 | 3.8 | 2.4 | 4.0 | 5.0 | 4.2 | 4.4 |
| 150 | 4.2 | 3.0 | 3.0 | 5.8 | 4.8 | 2.2 | 6.2 | 4.0 | 4.5 | 4.0 |
| 175 | 4.0 | 4.0 | 2.6 | 9.8 | 4.6 | 6.0 | 7.4 | 3.7 | 4.6 | 5.9 |
| 200 | 4.2 | 2.8 | 5.0 | 4.8 | 4.0 | 4.6 | 8.2 | 1.5 | 5.3 | 3.4 |

At the expiration of 4 weeks, the peppers in 150–200 gauge looked fresh and turgid, but had an occasional rotting fruit. These were compared with control peppers stored at the same temperature in normal air, the latter having shrivelled and started to rot within 7 to 10 days; peppers had lost their fresh turgid appearance, became desiccated with some turned yellow in color, indicating an over-mature stage and the peppers were soft and unmarketable.

Peppers in 100 and 125 gauge film performed well, but only for 2 weeks. Peppers stored in lower film gauge than 100 indicated a higher $O_2$ level and lower $CO_2$ level which resulted in faster maturity (yellowing), wilt and rot development. Peppers stored in higher film gauges than 200 indicated higher $CO_2$ accumulation and lower $O_2$ content which suppressed respiration greater than desired and resulted in very high turgidity associated with "pickling" flavor.

EXAMPLE V.—STRAWBERRIES

Strawberries are highly perishable foods whose storage period at 32° F. in normal air is accepted as being only 10 days maximum. Strawberries are nonclimacteric plant material and their oxygen demand is in the order of 10.9 milligrams of $O_2$ per kilogram strawberries per hour at 32° F., 15.1 milligrams at 40° F., and 33.0 milligrams at 50° F.

One to two quarts of strawberries weighing approximately 0.540 kilogram each were placed in open-mouthed bags of polyethylene film of varying thicknesses from 80 to 300 gauge having the same permeability as the film used in Example I. Prior to sealing each bag about 490 cc. of air were exhausted, leaving within the sealed bags about 542 cc. of air which contained $O_2$ in the amount of about 200 cc. per kilogram of enclosed strawberries. The bags had an internal surface area of 198 square inches being 1 square inch per 0.0027 kilogram of enclosed strawberries.

The sealed packages were stored at 32–34° F. for a period of four weeks, taking periodic $O_2$ and $CO_2$ readings of the internal atmosphere. The results are shown in the following table:

Pineapples (var. Queen) in all film thicknesses remained in good condition through five weeks of storage.

| Film Gauge | Days at 32–34° F. | | | | | | | | | | | |
|---|---|---|---|---|---|---|---|---|---|---|---|---|
| | 7 | | 14 | | 19 | | 21 | | 28 | | Mean | |
| | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ |
| 80 | 3.4 | 8.0 | 4.8 | 10.6 | 3.8 | 15.6 | | | 5.6 | 6.4 | 4.4 | 10.1 |
| 125 | 4.6 | 3.4 | 5.8 | 5.4 | 5.6 | 4.8 | | | 6.9 | 2.9 | 6.0 | 4.2 |
| 200 | 6.4 | 3.0 | 8.2 | 2.0 | 8.0 | 1.4 | 7.4 | 4.2 | 7.9 | 1.4 | 8.1 | 2.1 |
| 250 | 6.8 | 3.6 | 12.4 | 2.8 | 12.8 | 1.8 | 9.8 | 2.8 | 9.0 | 1.3 | 10.3 | 2.4 |
| 300 | 7.6 | 2.6 | 15.6 | 2.8 | 12.8 | 2.0 | 12.8 | 2.4 | 9.6 | 2.4 | 11.7 | 2.4 |

At the expiration of four weeks the strawberries packed in 200 to 300 gauge polyethylene films were fresh in appearance and in excellent condition when berries were initially sound. Strawberries stored in other film thicknesses had excessive physiological breakdown and mold growth, thus making the package unattractive. This was due to failure to maintain a sufficiently high level of $CO_2$ and low level of $O_2$ as required to prevent physiological breakdown. These were compared with control strawberries stored in normal air at the same temperature having wilted and lost their bright color within 2 weeks; the berries were severely shrivelled and dull in appearance and the berries were unmarketable.

EXAMPLE VI.—PINEAPPLE

Pineapples are a perishable food whose storage period at 40–45° F. in normal air is accepted as being only 2–4 weeks. Pineapples are nonclimacteric plant material and their oxygen demand is in the order of 5 cc. of $O_2$ per kilogram pineapples per hour at 45° F.

Pineapples weighing about 1.6 kilogram each were placed in separate open-mouthed bags of polyethylene film of varying thicknesses from 125 to 250 gauge having the same permeability as the film used in Example I. Prior to sealing each bag about 1906 cc. of air were exhausted leaving within the sealed bags about 876 cc. of air which contained $O_2$ in the amount of about 109.5 cc. $O_2$ per kilogram of enclosed pineapples. The internal surface area of film confining the contents was 1 square inch per 0.0046 kilogram of enclosed pineapples.

After 4 hours at 45° F., the sealed 250 gauge was sampled for its $O_2$ and $CO_2$ content and found to be 8.3% $O_2$ and 5.3% $CO_2$ as compared to its original content of 21% $O_2$ and 0.03% $CO_2$.

Sealed packages of Queen (Montufar) pineapples were stored at 45° F. for a period of 9 weeks taking periodic $CO_2$ and $O_2$ readings of the internal atmospheres.

After five weeks internal browning and surface mold growth developed in pineapples in 1.25 and 1.5 mil polyethylene. This same condition developed in pineapples in 2.0 and 2.5 mil polyethylene bags but after 8 and 9 weeks of storage respectively. Flavor, aroma and appearance of pineapples stored 7–8 weeks in 2.0 and 2.5 mil polyethylene films, respectively, were excellent. These were compared to control pineapples stored in normal air at the same temperature, the latter having become soft, rotted and unmarketable within three weeks.

Sealed packages of Smooth Cayenne pineapples were stored at 45° F. for a period of 6 weeks taking periodic $CO_2$ and $O_2$ readings of the internal atmospheres.

| Film Gauge | Days at 45° F. | | | | | | | | | | | |
|---|---|---|---|---|---|---|---|---|---|---|---|---|
| | 14 | | 21 | | 28 | | 35 | | 42 | | Mean | |
| | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ |
| 2.0 | 3.9 | 5.8 | 4.9 | 3.8 | 5.2 | 2.7 | 5.4 | 3.0 | | | 4.9 | 3.8 |
| 2.5 | 10.8 | 2.2 | 7.8 | 4.4 | 7.6 | 3.4 | 5.4 | 5.2 | 5.0 | 4.5 | 7.3 | 3.9 |
| 3.0 | 12.0 | 5.6 | 7.6 | 4.0 | 7.8 | 4.2 | 4.0 | 2.0 | 7.0 | 4.0 | 7.7 | 3.9 |

All Smooth Cayenne pineapples remained in good condition through three weeks of storage. After three weeks of storage pineapples in 2.0 mil polyethylene developed surface mold growth and internal breakdown; they were in an unmarketable condition. Through 5 weeks pineapples in 2.5 and 3.0 mil films were in good condition with excellent flavor, aroma and appearance.

These were compared to control pineapples stored in normal air at the same temperature; the latter having become soft, rotted and unmarketable within two weeks.

EXAMPLE VII.—SNAP BEANS

Snap beans are perishable foods whose storage period at 45–50° F. in normal air is accepted as being only from about 8 to 10 days. They are non-climacteric plant food and their oxygen demand is in the order of 30 milligrams of $O_2$ per kilogram snap beans per hour at 45° F.

About one quart of green snap beans weighing approximately 1 kilogram were placed in an open-mouthed bag of polyethylene film of varying thicknesses from 80 to 300 gauge having a permeability as in Example I. Prior to sealing each bag 1071 cc. of air were exhausted, leaving within the sealed bags 1178 cc. of air which contained $O_2$

| | Days at 45° F. | | | | | | | | | |
|---|---|---|---|---|---|---|---|---|---|---|
| | 7 | | 14 | | 21 | | 28 | | 35 | |
| | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ |
| Film Gauge: | | | | | | | | | | |
| 125 | 2.2 | 9.6 | 3.2 | 4.5 | 2.5 | 2.5 | 3.4 | 4.0 | 3.8 | 6.0 |
| 150 | 3.6 | 5.6 | 2.3 | 4.5 | 3.0 | 7.5 | 2.0 | 8.0 | 4.7 | 4.0 |
| 200 | 4.0 | 4.3 | 5.0 | 5.7 | 5.0 | 3.3 | 4.8 | 4.0 | 4.0 | 5.7 |
| 250 | 4.4 | 2.2 | 3.4 | 5.0 | 4.8 | 1.7 | 3.4 | 5.0 | 4.8 | 3.7 |

| | Days at 45° F. | | | | | | | | | |
|---|---|---|---|---|---|---|---|---|---|---|
| | 42 | | 49 | | 56 | | 63 | | Mean | |
| | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ |
| Film Gauge: | | | | | | | | | | |
| 125 | 3.8 | 5.5 | 3.8 | 6.8 | 4.7 | 4.0 | 4.5 | 6.8 | 3.5 | 5.5 |
| 150 | 5.0 | 4.0 | 5.0 | 2.8 | 3.2 | 6.0 | 4.5 | 4.5 | 3.7 | 5.2 |
| 200 | 3.5 | 6.9 | 5.0 | 3.0 | 5.7 | 3.9 | | 3.0 | 4.6 | 4.4 |
| 250 | 5.8 | 3.1 | 4.7 | 3.9 | 4.4 | 5.3 | 5.3 | 3.5 | 4.5 | 3.7 | in the amount of 235 cc. $O_2$ per kilogram of enclosed snap beans. The internal area of film confining the contents was 1 square inch per 0.003 kilogram beans.

After 5 hours the 150 gauge sealed enclosure was sampled for its $O_2$ and $CO_2$ and was found to be 7.0% $O_2$ and 3.4% $CO_2$ as compared to its original content of 21% $O_2$ and 0.03% $CO_2$.

The sealed packages were stored at 45° F. for a period of four weeks, taking weekly $O_2$ and $CO_2$ readings of the internal atmosphere. The results are shown in the following table:

| Film Gauge | Days in Storage at 32° F. | | | | | | | | | | | |
|---|---|---|---|---|---|---|---|---|---|---|---|---|
| | 7 | | 14 | | 21 | | 28 | | 35 | | Mean | |
| | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ |
| 75 | 1.0 | 14.0 | 1.4 | 10.4 | 1.4 | 11.0 | 2.0 | 13.5 | 2.8 | 9.2 | 1.7 | 11.6 |
| 100 | 1.2 | 12.8 | 2.2 | 11.6 | 2.4 | 9.6 | 2.2 | 12.6 | 1.8 | 10.4 | 1.9 | 11.4 |
| 130 | 1.0 | 11.8 | 2.4 | 9.2 | 1.2 | 10.8 | 1.6 | 12.4 | 3.0 | 10.2 | 1.8 | 10.9 |
| 150 | 2.0 | 12.4 | 4.2 | 8.4 | 3.6 | 10.4 | 2.4 | 11.6 | 2.4 | 8.6 | 2.9 | 10.3 |
| 200 | 1.4 | 11.4 | 4.6 | 11.0 | 2.6 | 10.2 | 2.6 | 11.8 | 4.0 | 7.6 | 3.0 | 10.4 |
| 250 | 3.0 | 11.4 | 5.6 | 6.2 | 3.0 | 9.6 | 3.0 | 10.0 | 6.2 | 6.6 | 4.2 | 8.7 |
| 300 | 4.0 | 10.4 | 6.0 | 5.8 | 1.0 | 8.8 | 3.6 | 6.6 | 6.9 | 5.6 | 4.3 | 7.8 |

| Film Gauge | Days in Storage at 45° F. | | | | | | | | | |
|---|---|---|---|---|---|---|---|---|---|---|
| | 7 | | 14 | | 21 | | 28 | | Mean | |
| | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ |
| 80 | 3.8 | 9.8 | 6.6 | 6.0 | 4.2 | 5.2 | 5.8 | 1.2 | 5.1 | 5.6 |
| 125 | 6.0 | 2.2 | 6.6 | 2.4 | 8.0 | 2.8 | 9.0 | 1.2 | 7.4 | 2.2 |
| 150 | 7.4 | 2.6 | 5.6 | 1.6 | 7.8 | 2.4 | 6.4 | 1.8 | 6.8 | 2.1 |
| 200 | 8.0 | 4.4 | 8.4 | 2.2 | 10.0 | 2.0 | 12.2 | 1.0 | 9.7 | 2.4 |
| 250 | 9.4 | 4.4 | 8.6 | 3.8 | 9.0 | 2.0 | 10.8 | 1.6 | 9.5 | 3.0 |

At the expiration of three weeks, the snap beans in the 80 to 250 gauge packages looked fresh, turgid and showed no rots. A browning or surface pitting became evident at this time in the 80 and 150 gauge samples, but the 125, 200 and 240 gauge packages were not affected. At the expiration of four weeks the 125 and 250 gauges packages looked fresh, turgid and possessed only very slight mold growth. At this point the 250 gauge package appeared of better quality than even the 125 gauge, the latter having begun to show signs of breakdown. These were compared with control snap beans stored at the same temperature in normal air, the latter having wilted and shrunk within two weeks; they had lost their turgidity and become dull in appearance and the beans were unmarketable.

EXAMPLE VIII.—GRAPES

American varieties of grapes are not adapted to long storage and they are considered perishable foods whose storage period at 32° F. does not exceed 3 to 4 weeks at the most. They are nonclimacteric food and their oxygen consumption demand is in the order of 2.8 milligrams $O_2$ per kilogram grapes per hour at 32° F.

Grapes weighing approximately 0.616 kilogram were placed in an open-mouthed bag of polyethylene film of varying thicknesses from 75 to 300 gauge having a permeability as in Example I. Prior to sealing each bag about 378 cc. of air were exhausted leaving within the sealed bags 337 cc. of air which contained $O_2$ in the amount of 109.5 cc. $O_2$ per kilogram of enclosed grapes. the internal area of film confining the contents was 1 square inch per 0.008 kilogram grapes.

After 12 hours, the 250 gauge sealed enclosure was sampled for its $O_2$ and $CO_2$ content and was found to be 10.0% $O_2$ and 1.1% $CO_2$ as compared to its original content of 21% $O_2$ and 0.03% $CO_2$.

Sealed packages were stored at 32° F. for a period of 5 weeks, taking weekly $O_2$ and $CO_2$ readings of the internal atmosphere. The results are shown in the following table:

At the expiration of five weeks, grapes in 200–300 gauge films looked fresh, turgid and showed no rots. Other film gauges maintained sound grapes for only 3 weeks of storage. Grapes under this modified atmosphere system showed good, sweet flavor and green pedicels. Control grapes stored at the same temperature in normal air wilted and shrunk within two weeks storage; they had lost their turgidity and become dull in appearance. Pedicels of control grapes withered and berries started to fall off the bunches after 2 weeks.

Further experiments with Vinifera (European) type of grapes showed similar atmospheric composition to the above. Grapes in 200–300 gauge films looked fresh, turgid and showed green pedicels with no rots or molds. These were compared with control grapes stored at the same temperature in normal air, the latter having wilted, shrunk and lost their bright color; the pedicels wilted and the berries dropped off.

EXAMPLE IX.—CAULIFLOWER

Cauliflower are perishable foods and are not usually kept in cold storage. However, in good conditions, heads of cauliflower can be stored for 2 weeks at 32° F. They are a nonclimacteric food and their oxygen demand is in the order of 20 milligrams $O_2$ per kilogram cauliflower per hour at 32° F.

Heads of cauliflower weighing approximately 0.746 kilogram were placed in an open-mouthed bag of polyethylene film of varying thicknesses from 75 to 300 gauge having a permeability as in Example I. Prior to sealing each bag about 222.5 cc. of air were exhausted leaving within the sealed bags 350 cc. of air which contained $O_2$ in the amount of 70 cc. $O_2$ per kilogram of enclosed cauliflower. The internal area of film confining the contents was 1 square inch per 0.008 kilogram cauliflower.

After 4 hours the 130 gauge sealed enclosure was sampled for its $O_2$ and $CO_2$ and was found to be 7.6% $O_2$ and 4.6% $CO_2$ as compared to its original content of 21% $O_2$ and 0.03% $CO_2$.

Sealed packages were stored at 32° F. for a period of 7 weeks taking weekly $O_2$ and $CO_2$ readings of the internal atmosphere. Results are shown in the following table:

| | Days in Storage at 32° F. | | | | | | | | | | | | | | | |
|---|---|---|---|---|---|---|---|---|---|---|---|---|---|---|---|---|
| | 7 | | 14 | | 21 | | 28 | | 35 | | 42 | | 49 | | Mean | |
| | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ |
| Film Gauge: | | | | | | | | | | | | | | | | |
| 75 | 6.2 | 1.8 | 4.4 | 11.8 | 4.4 | 2.8 | 1.8 | 10.6 | 3.2 | 10.8 | 2.2 | 11.0 | 2.4 | 10.0 | 3.5 | 8.4 |
| 100 | 5.0 | 1.6 | 6.0 | 10.6 | 6.2 | 1.2 | 3.6 | 11.0 | 4.2 | 4.6 | 4.0 | 10.0 | 5.0 | 2.2 | 5.0 | 4.4 |
| 150 | 7.4 | 1.2 | 5.4 | 7.4 | 4.8 | 1.6 | 5.6 | 1.4 | 3.2 | 3.2 | 6.4 | 2.2 | 4.6 | 2.4 | 5.5 | 2.8 |
| 200 | 9.0 | 1.2 | 4.6 | 1.2 | 5.4 | 1.8 | 8.6 | 3.0 | 2.4 | 2.4 | 6.0 | 5.8 | 5.2 | 2.4 | 6.4 | 2.5 |

At the expiration of six weeks, heads of cauliflower in the 75 to 150 gauge looked fresh, turgid and showed no rots. Clusters were united, firm and white. The heads had white, rich compact curd with the jacket or outer leaves fresh, turgid and green. Cauliflower in films of 200 gauge browned after 5 weeks storage period and volatiles of undesirable odor accumulated in the bags of higher gauge films. Films ranging from 75–300 gauge were comparable for cauliflower, but only for 1 week. Cauliflower in 100 gauge film was still in good condition after 7 weeks storage. These were compared with control cauliflower stored at the same temperature in normal air, the latter having wilted, shrunk and yellowed water 2 weeks. Heads of control cauliflower advanced in maturity and become brown in color. Leaves become yellow and desiccated and dropped off.

EXAMPLE X.—BROCCOLI

Broccoli is a highly perishable food and does not keep well in storage. Broccoli is usually held for only very short periods. The best storage temperature to retain the maximum salable condition and to preserve the vitamin C content is 32° F., and only for a week or 10 days.

Broccoli is a nonclimacteric plant material and its oxygen demand is in the order of 25.8 milligrams $O_2$ per kilogram per hour at 32° F.

Heads of broccoli weighing approximately 0.713 kilogram were placed in an open-mouthed bag of polyethylene film of varying thicknesses from 75–300 gauge having a permeability as in Example I. Prior to sealing each bag about 1147 cc. of air were exhausted leaving within the sealed bags 802 cc. of air which contained $O_2$ in the amount of 160 cc. $O_2$ per kilogram of enclosed broccoli. The internal area of film confining the contents was 1 square inch per 0.005 kilogram broccoli.

After 4 hours at 32° F., the sealed 130 gauge enclosure was sampled for its $O_2$ and $CO_2$ content and found to be 8.0% $O_2$ and 2.8% $CO_2$ as compared to its original content of 21% $O_2$ and .03% $CO_2$.

The sealed packages were stored at 32° F. for a period of 4 weeks taking weekly $O_2$ and $CO_2$ readings of the internal atmosphere. Results are shown in the following table:

At the expiration of 3 weeks, broccoli in 75–150 gauge sealed packages under modified atmosphere looked fresh, had compact heads, and were turgid and green. The jackets of outer leaves were still fresh and bright green. At the expiration of 4 weeks only heads of broccoli in the 75–130 gauge films were sound and in excellent condition. Broccoli in 150 gauge film or higher began to possess an undesirable odor after 3 weeks storage as a result of volatile accumulation in these high gauge films. Control broccoli stored at the same temperature in normal air yellowed, wilted and lost the bright green color within the second week of storage. These control heads of broccoli started to discolor and their buds were separated and started to drop off; they were considered unmarketable within 2 weeks storage. Leaves of the jacket in the control broccoli discolored at the end of one week storage duration.

EXAMPLE XI.—EGGPLANT

Eggplants are highly perishable foods whose storage period at 50° F. does not exceed 10 days. They cannot be expected to keep satisfactorily in storage due to physiological disorders associated with cold storage as surface pitting and bronzing. They are nonclimacteric plant food and their oxygen demand is in the order of 33–37 milligrams of $O_2$ per kilogram per hour at 50°–56° F.

Eggplants weighing approximately 0.719 kilogram were placed in an open-mouthed bag of polyethylene film of varying thicknesses from 75–100 gauge having a permeability as in Example I. Prior to sealing each bag about 172 cc. of air were exhausted leaving within the sealed bags 5 cc. of air which contained $O_2$ in the amount of 1.3 cc. $O_2$ per kilogram of enclosed eggplant. The internal area of film confining the contents was 1 square inch per 0.009 kilogram eggplant.

After 2 hours at 50–56° F., the sealed 80 gauge enclosure was sampled for its $O_2$ and $CO_2$ content and was found to be 7.0% $O_2$ and 3.2% $CO_2$ as compared to its original content of 21% $O_2$ and 0.03% $CO_2$.

The sealed packages were stored at 50–56° F. for a period of 3 weeks taking weekly $O_2$ and $CO_2$ readings of the internal atmosphere. Results are shown in the following table:

| | Days in Storage at 50-56° F. | | | | | | | |
|---|---|---|---|---|---|---|---|---|
| | 7 | | 14 | | 21 | | Mean | |
| Film Gauge | Percent $CO_2$ | Percent $O_2$ | Percent $CO_2$ | Percent $O_2$ | Percent $CO_2$ | Percent $O_2$ | Percent $CO_2$ | Percent $O_2$ |
| 75 | 2.4 | 12.0 | 2.4 | 8.8 | 3.2 | 10.0 | 2.3 | 10.2 |
| 80 | 3.0 | 7.0 | 4.2 | 6.8 | 4.0 | 9.0 | 3.7 | 7.6 |
| 100 | 3.8 | 5.0 | 6.0 | 6.0 | 4.9 | 8.0 | 4.9 | 6.3 |

At the expiration of 2 weeks storage, eggplants in 75–100 gauge films were sound, fresh and in excellent quality.

| | Days in Storage at 32° F. | | | | | | | | |
|---|---|---|---|---|---|---|---|---|---|
| | 7 | | 14 | | 21 | | 28 | | Mean | |
| Film Gauge | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ |
| 75 | 1.4 | 10.4 | 3.2 | 5.0 | 4.0 | 9.4 | 5.0 | 8.0 | 3.4 | 8.2 |
| 100 | 2.2 | 9.6 | 3.8 | 3.2 | 4.6 | 8.0 | 5.6 | 6.0 | 4.0 | 6.7 |
| 130 | 3.4 | 9.2 | 4.4 | 2.6 | 4.8 | 5.8 | 6.4 | 5.0 | 4.7 | 5.6 |
| 150 | 4.2 | 8.4 | 5.2 | 2.8 | 6.8 | 2.6 | 7.5 | 3.0 | 5.9 | 4.2 |

However, only 75 and 80 gauge films maintained excellent eggplants at the expiration of 3 weeks storage period. Eggplants from the sealed enclosures were shiny, turgid and free of rots or physiological breakdown. Pulp and seed were white and firm. Control eggplants at the same temperature in normal air were wilted and shrunken after one week; pits which showed as sunken areas, dull appearance and corky pulp were features of the control eggplants.

EXAMPLE XII.—CUCUMBERS

Cucumbers are perishable food and usually held in storage only for short period and cannot be expected to keep satisfactorily more than 2 to 3 weeks at 45–50° F. They are nonclimacteric plant food and their oxygen consumption is in the order of 20 milligrams of $O_2$ per kilogram per hour at 45–50° F.

Cucumbers weighing approximately 1.0 kilogram were placed in an open-mouthed bag of polyethylene film of varying thicknesses from 80–200 gauge having a permeability as in Example I. Prior to sealing each bag about 326 cc. of air were exhausted leaving within the sealed bags 125 cc. of air which contained 25 cc. $O_2$ per kilogram of enclosed cucumbers. The internal area of film confining the contents was 1 square inch per 0.0033 kilogram cucumbers.

After 6 hours at 45° F., the sealed 150 gauge enclosure was sampled for its $O_2$ and $CO_2$ content and was found to be 6.0% $O_2$ and 3.0% $CO_2$ as compared to its original content of 21% $O_2$ and 0.03% $CO_2$.

The sealed packages were stored at 45° F. for a period of 4 weeks taking weekly $O_2$ and $CO_2$ readings of the internal atmosphere. Results are shown in the following table:

their husks weighing approximately 1.115 kilograms were placed in an open-mouthed bag of polyethylene film of varying thicknesses from 75–200 gauge having a permeability as in Example I. Prior to sealing each bag about 729 cc. of air were exhausted leaving within the sealed bags 237 cc. of air which contained 47 cc. of $O_2$ per kilogram of enclosed corn. The internal area of film confining the contents was 1 square inch per 0.0065 kilogram corn.

After 4 hours at 32° F., the sealed 100 gauge enclosure was sampled for its $O_2$ and $CO_2$ content and was found to be 8.0% $O_2$ and 4.7% $CO_2$ as compared to its original content of 21% $O_2$ and 0.03% $CO_2$.

The sealed packages were stored at 32° F. for 3 weeks taking $CO_2$ and $O_2$ readings of the internal atmosphere. Results are shown in the following table:

| Film Gauge | Days in Storage at 32° F. | | | | | | | |
|---|---|---|---|---|---|---|---|---|
| | 7 | | 14 | | 21 | | Mean | |
| | Percent $CO_2$ | Percent $O_2$ | Percent $CO_2$ | Percent $O_2$ | Percent $CO_2$ | Percent $O_2$ | Percent $CO_2$ | Percent $O_2$ |
| 75 | 7.4 | 7.0 | 3.6 | 12.0 | 4.0 | 13.0 | 5.0 | 7.3 |
| 80 | 7.8 | 7.2 | 3.8 | 10.0 | 5.0 | 8.0 | 5.5 | 8.4 |
| 100 | 12.6 | 3.8 | 8.0 | 7.4 | 2.6 | 5.0 | 7.7 | 5.3 |

At the expiration of 3 weeks storage, sweet corn from the sealed enclosures looked fresh, firm and bright in color; in a similar condition as when harvested. Cooked corn flavor was good, and kernels were moist and soft. Storing sweet corn in higher gauge films of 130 and 150 resulted in off-flavor after 2 weeks storage. This was due to the high accumulation of $CO_2$ in the enclosure. Control corn stored at the same temperature in normal air lost its flavor after a 1-week storage period. Control corn wilted and the husk dried up, and kernels lost their moist tender texture.

Tests on summer squash, carrots and celery were conducted as in previous examples. These foods are nonclimacteric plant material and their oxygen demand ranges from 5.6–20 milligrams $O_2$ per kilogram food per hour at 32° F. The $O_2$ content remaining in the sealed enclosures ranged from 3–135 cc. $O_2$ per kilogram enclosed

| Film Gauge | Days in Storage at 45° F. | | | | | | | | | |
|---|---|---|---|---|---|---|---|---|---|---|
| | 7 | | 14 | | 21 | | 28 | | Mean | |
| | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ |
| 80 | 4.6 | 6.4 | 4.4 | 7.2 | 4.0 | 5.8 | 3.8 | 4.0 | 4.2 | 5.8 |
| 110 | 5.0 | 4.2 | 7.2 | 3.8 | 6.4 | 3.8 | 7.8 | 2.2 | 6.6 | 3.3 |
| 130 | 6.4 | 3.4 | 8.0 | 2.8 | 9.0 | 3.0 | 9.2 | 1.6 | 8.1 | 2.7 |
| 150 | 9.0 | 2.0 | 8.4 | 4.6 | 10.0 | 2.0 | 10.2 | 2.4 | 9.4 | 2.6 |
| 200 | 4.6 | 5.6 | 5.4 | 4.0 | 5.8 | 3.8 | 9.0 | 2.2 | 6.2 | 3.9 |

At the expiration of 4 weeks, cucumbers from the sealed enclosures were fresh, firm, bright green and free of rots and molds. Control cucumbers stored at the same temperature in normal air advanced in maturity and became yellow after 2 weeks. Control cucumbers shrivelled, softened and became surface-pitted; their texture was rubbery, seeds hardened, and flavor became tasteless or flat.

EXAMPLE XIII.—SWEET CORN

Sweet corn are perishable food and seldom are stored. Storage for more than a few days at 32° F. results in serious deterioration as a result of rapid decrease in sugar content which so largely determines quality in this product. Submerging the freshly harvested corn in tanks of ice water immediately after removal from the field to reduce temperature to as near 32° as possible is a practice to extend storage to 4–8 days maximum.

Sweet corn are nonclimacteric plant food and their oxygen consumption is in the order of 32 milligrams $O_2$ per kilogram corn per hour at 32° F.

Fresh ears of sweet corn with good flavor and still in food. The internal area of film confining the content was 1 square inch per 0.002–0.007 kilogram of enclosed food. Summer squash was stored in sealed packages of 100–300 film gauge in good condition for 2 weeks; the atmospheric composition was 1.4–10.8% for $O_2$ around a mean of 6.1%; for $CO_2$ 3.2–7.6% around a mean of 5.2%. Celery was stored in sealed packages of 100–300 film gauge in good condition for 6 weeks; the atmospheric composition was for $O_2$ 2.8–6.8% around a mean of 6.2%; for $CO_2$ 1.0–6.0% around a mean of 3.8%. Carrots were stored in sealed packages of 100–150 film gauge for 4 weeks in a good condition; the atmospheric composition was for $O_2$ 2.0–4.8% around a mean of 3.1%; for $CO_2$ 5.0–12% around a mean of 7.8%. Control samples stored at the same temperature for the same periods of time of all these nonclimacteric foods wilted and lost their good quality of bright appearance and firmness.

Other gas permeable plastic films such as Pliofilm, polyproylene, polystyrene, cellulose acetate and vinyl films which have suitable gas permeabilities due to the presence of specific plasticizers or otherwise and also possess the other essential physical characteristics provided by polyethylene, can equally well be used, though in their present commercial forms they do not generally have an high $O_2$ diffusion rates as low density polyethylene, and therefore would have to be used in such thinness as to raise their $CO_2$ permeability too high, and with less tensile strength than is desirable as rupture cannot be countenanced.

What is claimed is:

1. The method of packing perishable fresh foods which after harvest respire without material rise in respiration rate in any stable environment of temperature and ambient atmosphere, resulting in complete senescence and spoilage in normal air within a period of 30 days even when refrigerated, which includes the steps of inserting a manually portable weight of the harvested food into an imperforate enclosure formed of flexible gas-permeable plastic sheet material having a permeability to $O_2$ of the order of 2848 cc. and to $CO_2$ of the order of 4195 cc., both per mil per 100 square inches per 24 hours at STP and having a thickness from about 75–300 gauge, extracting excess air from the enclosure to collapse the sheet material into a configuration generally conforming to the exterior shape of adjacent portions of the enclosed food to establish a relatively fixed internal surface area of about one square inch of enclosing permeable material per .001–.009 kilogram of enclosed food and sealing the enclosure while it contains, in its collapsed form, a remaining air volume contacting the food which is less than the volumetric capacity of the uncollapsed enclosure minus the volume of enclosed solids, and which contains between about 1.3 and about 235 cc. of $O_2$ per kilogram of enclosed food to cause a less than 12% $O_2$ and elevated but subinjurious $CO_2$ atmosphere of not more than 12% $CO_2$ to be established endogenously within said enclosure within 12 hours of sealing and to be maintained thereafter around a mean between 1.2–11.1 $O_2$ and a mean between 1.4–14.8% $CO_2$ therein over a period of up to at least two weeks during storage at a temperature below room temperature but above 32° F.

2. The method as claimed in claim 1 wherein the inserted food is one or more heads of lettuce and the enclosed $O_2$ at the time of sealing is of the order of 136 cc. of $O_2$ per kilogram of enclosed lettuce and the internal surface area of said collapsed permeable material is of the order of 1 square inch per 0.0023 kilogram of enclosed lettuce and said material is a polyethylene film having a permeability to $O_2$ of the order of 2848 cc. and to $CO_2$ of the order of 4195 cc., both per mil per 100 square inches per 24 hours at STP, and having a thickness from about 75 to 300 gauge, and the storage temperature is about 32° F., to maintain within said enclosure after said 12 hours an $O_2$ content around a mean between 4.8–11.1% and a $CO_2$ content around a mean between 1.4–5.6% for a period up to at least 5–6 weeks.

3. The method as claimed in claim 1 wherein the food is asparagus, and the enclosed $O_2$ at the time of sealing is of the order of 93 cc. of $O_2$ per kilogram of enclosed asparagus and the internal surface area of said collapsed permeable material is of the order of 1 square inch per 0.004 kilogram of enclosed asparagus and said material is a polyethylene film having a permeability to $O_2$ of the order of 2848 cc. and to $CO_2$ of the order of 4195 cc., both per mil per 100 square inches per 24 hours at STP, and having a thickness from about 80 to 300 gauge and the storage temperature is about 32–34° F., to maintain within said enclosure after said 12 hours an $O_2$ content around a mean between 1.2–9.3% and a $CO_2$ content around a mean between 4.9–14.8% for a period up to at least 4 weeks.

4. The method as claimed in claim 1 wherein the food is mushrooms, and the enclosed $O_2$ at the time of sealing is of the order of 137 cc. of $O_2$ per kilogram of enclosed mushrooms and the internal surface area of said collapsed permeable material is of the order of 1 square inch per 0.0013 kilogram of enclosed mushrooms and said material is a polyethylene film having a permeability to $O_2$ of the order of 2848 cc. and to $CO_2$ of the order of 4195 cc., both per mil per 100 square inches per 24 hours at STP, and having a thickness from about 150 to 200 gauge and the storage temperature is about 32–34° F., to maintain within said enclosure after said 12 hours an $O_2$ content around a mean between 1.3–1.5% and a $CO_2$ content around a mean between 6.1–9.1% per a period up to at least 2 weeks.

5. The method as claimed in claim 1 wherein the food is peppers, and the enclosed $O_2$ at the time of sealing is of the order of 64 cc. of $O_2$ per kilogram of enclosed peppers and the internal surface area of said collapsed permeable material is of the order of 1 square inch per 0.006 kilogram of enclosed peppers and said material is a polyethylene film having a permeability to $O_2$ of the order of 2848 cc. and to $CO_2$ of the order of 4195 cc., both per mil per 100 square inches per 24 hours at STP, and having a thickness from about 100 to 200 gauge and the storage temperature is about 45° F., to maintain within said enclosure after said 12 hours an $O_2$ content around a mean between 3.4–6.5% and a $CO_2$ content around a mean between 3.2–5.3% for a period up to at least 4 weeks.

6. The method as claimed in claim 1 wherein the food is strawberries, and the enclosed $O_2$ at the time of sealing is of the order of 200 cc. of $O_2$ per kilogram of enclosed strawberries and the internal surface area of said collapsed permeable material is of the order of 1 square inch per 0.003 kilogram of enclosed strawberries and said material is a polyethylene film having a permeability to $O_2$ of the order of 2848 cc. and to $CO_2$ of the order of 4195 cc., both per mil per 100 square inches per 24 hours at STP, and having a thickness from about 200 to 300 gauge and the storage temperature is about 32–34° F., to maintain within said enclosure after said 12 hours an $O_2$ content around a mean between 2.1–2.4% and a $CO_2$ content around a mean between 8.1–11.7% for a period up to at least 4 weeks.

7. The method as claimed in claim 1 wherein the food is pineapples, and the enclosed $O_2$ at the time of sealing is of the order of 110 cc. of $O_2$ per kilogram of enclosed pineapples and the internal surface area of said collapsed permeable material is of the order of 1 square inch per 0.005 kilogram of enclosed pineapples and said material is a polyethylene film having a permeability to $O_2$ of the order of 2848 cc. and to $CO_2$ of the order of 4195 cc., both per mil per 100 square inches per 24 hours at STP, and having a thickness from about 150 to 300 gauge and the storage temperature is about 45° F., to maintain within said enclosure after said 12 hours an $O_2$ content around a mean between 3.7–5.7% and a $CO_2$ content around a mean between 3.7–7.7% for a period up to at least 8–9 weeks.

8. The method as claimed in claim 1 wherein the food is snap beans, and the enclosed $O_2$ at the time of sealing is of the order of 235 cc. of $O_2$ per kilogram of enclosed snap beans and the internal surface area of said collapsed permeable material is of the order of 1 square inch per 0.003 kilogram of enclosed snap beans and said material is a polyethylene film having a permeability to $O_2$ of the order of 2848 cc. and to $CO_2$ of the order of 4195 cc., both per mil per 100 square inches per 24 hours at STP, and having a thickness from about 125 to 250 gauge and the storage temperature is about 45° F., to maintain within said enclosure after said 12 hours an $O_2$ content around a mean between 2.1–5.6% and a $CO_2$ content around a mean between 5.1–9.7% for a period up to at least 4 weeks.

9. The method as claimed in claim 1 wherein the food is grapes, and the enclosed $O_2$ at the time of sealing is of the order of 110 cc. of $O_2$ per kilogram of enclosed grapes and the internal surface area of said collapsed permeable material is of the order of 1 square inch per 0.008 kilogram of enclosed grapes and said material is a polyethylene film having a permeability to $O_2$ of the order of 2848 cc. and to $CO_2$ of the order of 4195 cc., both per mil per 100 square inches per 24 hours at STP, and having a thickness from about 200 to 300 gauge and the storage temperature is about 32° F., to maintain within said enclosure after said 12 hours an $O_2$ content around a mean between 7.8–10.4% and a $CO_2$ content around a mean between 3.0–4.3% for a period up to at least 5 weeks.

10. The method as claimed in claim 1 wherein the food is cauliflower, and the enclosed $O_2$ at the time of sealing is of the order of 70 cc. of $O_2$ per kilogram of enclosed cauliflower and the internal surface area of said collapsed permeable material is of the order of 1 square inch per 0.008 kilogram of enclosed cauliflower and said material is a polyethylene film having a permeability to $O_2$ of the order of 2848 cc. and to $CO_2$ of the order of 4195 cc., both per mil per 100 square inches per 24 hours at STP, and having a thickness from about 75 to 200 gauge and the storage temperature is about 32° F., to maintain within said enclosure after said 12 hours an $O_2$ content around a mean between 2.5–8.4% and a $CO_2$ content around a mean between 3.5–6.4% for a period up to at least 6–7 weeks.

11. The method as claimed in claim 1 wherein the food is broccoli, and the enclosed $O_2$ at the time of sealing is of the order of 160 cc. of $O_2$ per kilogram of enclosed broccoli and the internal surface area of said collapsed permeable material is of the order of 1 square inch per 0.005 kilogram of enclosed broccoli and said material is a polyethylene film having a permeability to $O_2$ of the order of 2848 cc. and to $CO_2$ of the order of 4195 cc., both per mil per 100 square inches per 24 hours at STP, and having a thickness from about 75 to 150 gauge and the storage temperature is about 32° F., to maintain within said enclosure after said 12 hours an $O_2$ content around a mean between 4.2–8.2% and a $CO_2$ content around a mean between 3.4–5.9% for a period up to at least 4 weeks.

12. The method as claimed in claim 1 wherein the food is eggplant, and the enclosed $O_2$ at the time of sealing is of the order of 1.3 cc. of $O_2$ per kilogram of enclosed eggplant and the internal surface area of said collapsed permeable material is of the order of 1 square inch per 0.009 kilogram of enclosed eggplant and said material is a polyethylene film having a permeability to $O_2$ of the order of 2848 cc. and to $CO_2$ of the order of 4195 cc., both per mil per 100 square inches per 24 hours at STP, and having a thickness from about 75 to 100 gauge and the storage temperature is about 50–56° F., to maintain within said enclosure after said 12 hours an $O_2$ content around a mean between 6.3–10.2% and a $CO_2$ content around a mean between 2.3–4.9% for a period up to at least 3 weeks.

13. The method as claimed in claim 1 wherein the food is cucumbers, and the enclosed $O_2$ at the time of sealing is of the order of 25 cc. of $O_2$ per kilogram of enclosed cucumbers and the internal surface area of said collapsed permeable material is of the order of 1 square inch per 0.003 kilogram of enclosed cucumbers and said material is a polyethylene film having a permeability to $O_2$ of the order of 2848 cc. and to $CO_2$ of the order of 4195 cc., both per mil per 100 square inches per 24 hours at STP, and having a thickness from about 110 to 200 gauge and the storage temperature is about 45° F., to maintain within said enclosure after said 12 hours an $O_2$ content around a mean between 2.6–3.9% and a $CO_2$ content around a mean between 6.2–9.4% for a period up to at least 4 weeks.

14. The method as claimed in claim 1 wherein the food is fresh sweet corn, and the enclosed $O_2$ at the time of sealing is of the order of 47 cc. of $O_2$ per kilogram of enclosed sweet corn and the internal surface area of said collapsed permeable material is of the order of 1 square inch per 0.006 kilogram of enclosed sweet corn and said material is a polyethylene film having a permeability to $O_2$ of the order of 2848 cc. and to $CO_2$ of the order of 4195 cc., both per mil per 100 square inches per 24 hours at STP, and having a thickness from about 75 to 100 gauge and the storage temperature is about 32° F., to maintain within said enclosure after said 12 hours an $O_2$ content around a mean between 5.3–8.4% and a $CO_2$ content around a mean between 5.0–7.7% for a period up to at least 3 weeks.

References Cited

UNITED STATES PATENTS 2,611,709  9/1952  Plagge _____ 99—171
2,571,340  10/1951  Carson _____ 99—171

OTHER REFERENCES

Davis: Paper Trade Journal, 123, No. 9, 33 and 37–39, Aug. 29, 1946.

Gerhardt et al.: Modern Packaging, pp. 163–165, June 1948.

Landrock et al.: TAPPI, 35, 241–246, June 1952.

RAYMOND N. JONES, *Primary Examiner.*

PO-1050
(5/69)

UNITED STATES PATENT OFFICE
CERTIFICATE OF CORRECTION

Patent No. 3,450,543      Dated June 17, 1969

Inventor(s) Adnan M. Badran et al.

It is certified that error appears in the above-identified patent and that said Letters Patent are hereby corrected as shown below:

Column 3, line 4, change "the" to --that--; line 38, change "carbohydrate" to --carbohydrates--. Column 6, in the table for Example II - Asparagus, the third, fifth, seventh, ninth, eleventh columns should be headed --Percent $O_2$-- instead of "Percent $CO_2$". Column 7, in the first table for Example III - Mushrooms, change percent $CO_2$ for 125 Gauge film after three days at 50° F. from "6.8" to --5.8--; in the second table for Example III - Mushrooms, in the first column, the second line below "Percent" should read --$O_2$-- instead of "$CO_2$". Column 1; line 28, change "water" to --after--. Column 15, line 11, omit the hyphen at the end of the line. Column 17, line 3, change "an" to --as--. Column 18, line 9, change "per" to --for--.

SIGNED AND
SEALED
MAR 17 1970

(SEAL)
Attest:

Edward M. Fletcher, Jr.
Attesting Officer

WILLIAM E. SCHUYLER, JR.
Commissioner of Patents